(12) United States Patent
Signorelli et al.

(10) Patent No.: US 8,212,567 B2
(45) Date of Patent: Jul. 3, 2012

(54) EXTERNALLY MOUNTED BAND ANTENNAE REQUIRING MINIMAL METAL CUTTING ON DRILLSTRING FOR REDUCTION OF MECHANICAL STRESSES

(75) Inventors: John A. Signorelli, Houston, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 589 days.

(21) Appl. No.: 12/254,102

(22) Filed: Oct. 20, 2008

(65) Prior Publication Data

US 2010/0097279 A1 Apr. 22, 2010

(51) Int. Cl.
*G01V 3/00* (2006.01)
*G01V 3/18* (2006.01)

(52) U.S. Cl. .................................. 324/338; 324/332

(58) Field of Classification Search ................... None
See application file for complete search history.

(56) References Cited

U.S. PATENT DOCUMENTS

| | | | |
|---|---|---|---|
| 4,714,881 A * | 12/1987 | Givens | 324/303 |
| 4,785,247 A * | 11/1988 | Meador et al. | 324/338 |
| 5,138,263 A | 8/1992 | Towle | |
| 5,530,358 A | 6/1996 | Wisler et al. | |
| 5,563,512 A | 10/1996 | Mumby | |
| 5,796,252 A * | 8/1998 | Kleinberg et al. | 324/303 |
| 6,179,066 B1 * | 1/2001 | Nasr et al. | 175/45 |
| 6,255,817 B1 * | 7/2001 | Poitzsch et al. | 324/303 |
| 6,516,898 B1 | 2/2003 | Krueger | |
| 6,577,129 B1 * | 6/2003 | Thompson et al. | 324/338 |
| 7,235,970 B2 * | 6/2007 | Kruspe et al. | 324/300 |
| 7,525,315 B2 * | 4/2009 | Fredette et al. | 324/342 |
| 2001/0042643 A1 | 11/2001 | Krueger et al. | |

FOREIGN PATENT DOCUMENTS

EP 1607571 A2 12/2005

OTHER PUBLICATIONS

S.G. Mack, et al. "The Design, Response, and Field Test Results of a New Slim Hole LWD Multiple Frequency Resistivity Propagation Tool". SPE 77483. SPE Annual Technical Conference and Exhibition held in San Antonio, Texas, Sep. 29-Oct. 2, 2002.
D.T. Macune, et al. "A Compact Compensated Resistivity Tool for Logging While Drilling". IADC.SPE 98106. IADC/SPE Drilling Conference held in Miami, Florida, U.S.A. Feb. 21-23, 2006.
International Search Report and Written Opinion, Mailed May 25, 2010, International Appln. No. PCT/US2009/061020, Written Opinion 4 pages, International Search Report 7 pages.

* cited by examiner

*Primary Examiner* — Paresh Patel
(74) *Attorney, Agent, or Firm* — Cantor Colburn LLP

(57) ABSTRACT

An instrument disposed into a drill string for imaging an earth formation includes: at least one band antenna disposed over an intermediate layer disposed into a groove in an outer surface of the drill string. A method of fabrication is provided.

11 Claims, 8 Drawing Sheets

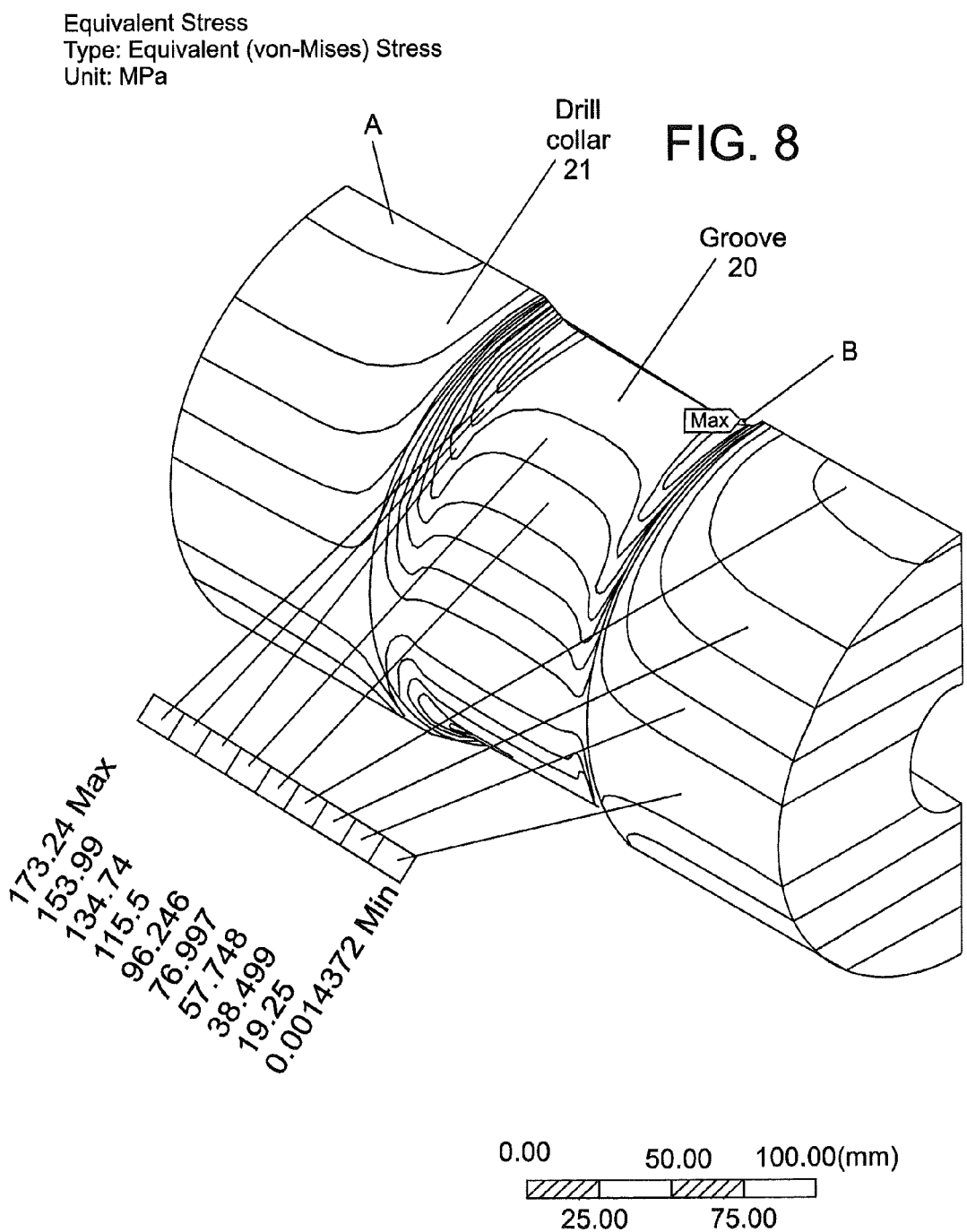

EXTERNALLY MOUNTED BAND ANTENNAE REQUIRING MINIMAL METAL CUTTING ON DRILLSTRING FOR REDUCTION OF MECHANICAL STRESSES

BACKGROUND OF THE INVENTION

1. Field of the Invention

The invention disclosed herein relates to exploration for oil and gas and, in particular, to improved methods and apparatus for providing antennae on exterior surface of drilling equipment.

2. Description of the Related Art

In the exploration for oil and gas, it is necessary to drill a borehole into the earth. While drilling of the borehole permits individuals and companies to evaluate sub-surface materials and to extract desired hydrocarbons, many problems are encountered. Once such problem is that of harsh environments down hole.

Many apparatus may be used for performing surveys of sub-surface materials while drilling the borehole. In general, such apparatus are referred to as providing a "logging while drilling" (LWD) or "measuring while drilling" (MWD) function.

On most present day logging while drilling tools, resistivity antenna(e) are created by placing wire loop antennae inside of deeply grooved channels cut into a body of a drillstring. The depth of the cut creates signal losses and unwanted stresses in the material (i.e., steel) of the drill collar. In order to improve signal strength, a very wide channel and/or ferrite materials are used. Unfortunately, this does not improve performance under mechanical stress or reduce complexity of the assembly.

Therefore, what are needed are methods and apparatus that provide for improved implementations of antenna(e) on drill string apparatus. Preferably, the methods and apparatus provide for minimal machining of drill apparatus, enhancements to mechanical strength and improved signal strength.

BRIEF SUMMARY OF THE INVENTION

An embodiment of the invention includes an instrument disposed into a drill string for imaging an earth formation, the instrument including: at least one band antenna disposed over an intermediate layer disposed into a groove in an outer surface of the drill string.

Another embodiment of the invention includes a method for fabricating an antenna in a drill string, the method including: placing a groove into an external circumference of the drill string; placing an intermediate material into the groove; and mounting at least one band antenna onto the intermediate material.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIGS. 7 and 8 depict stress mapping of the drill collar and a groove therein for retaining the band antenna.

DETAILED DESCRIPTION OF THE INVENTION

Disclosed are methods and apparatus that provide for improved implementations of antenna(e) on drill string apparatus. The methods and apparatus provide for minimal machining of drill apparatus, enhancements to mechanical strength and improved signal strength. In some embodiments, the methods and apparatus provide for reduced use or elimination of ferrite materials.

Figure 1:
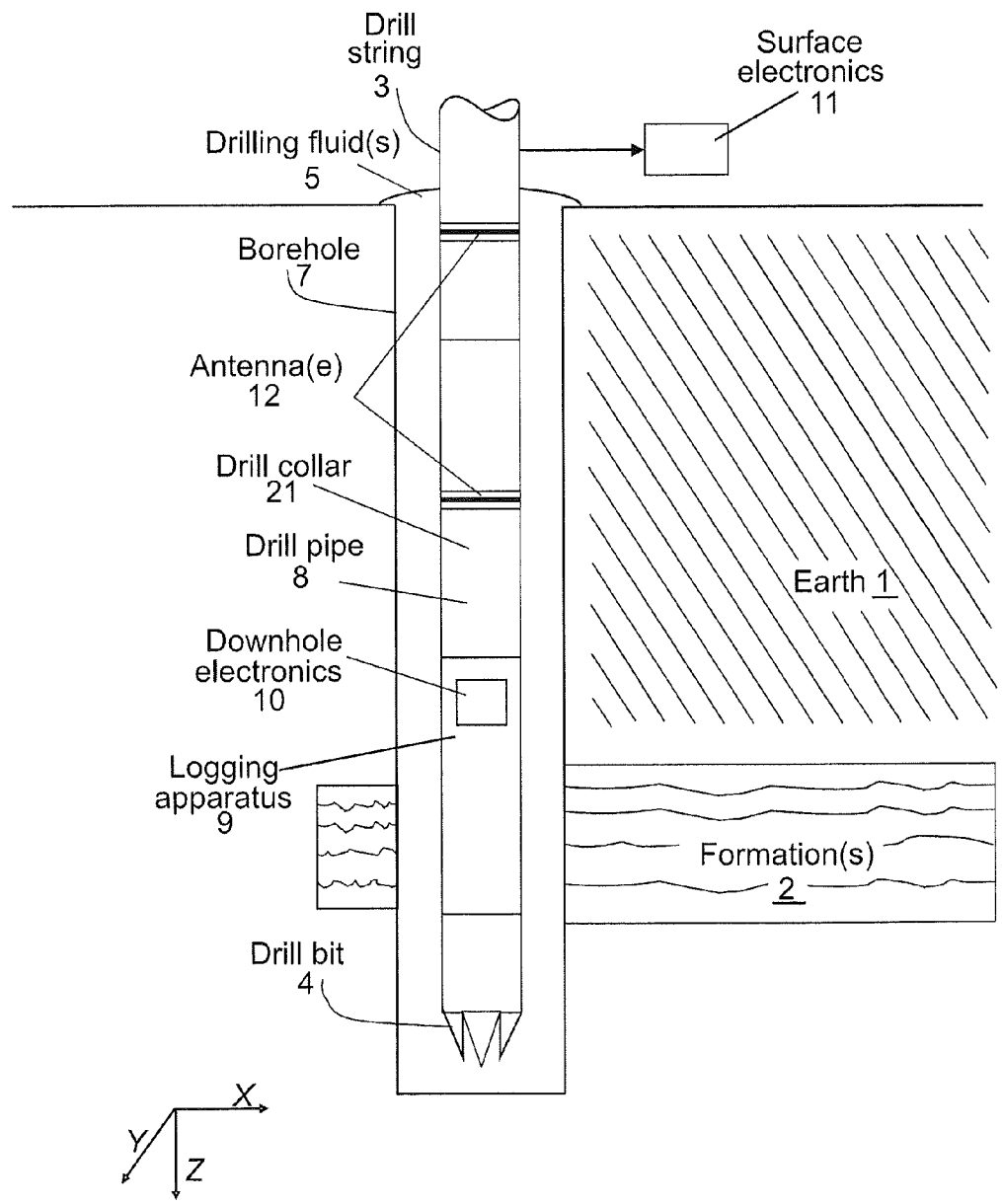
FIG. 1 depicts aspects of a drilling apparatus.

For perspective, refer now to FIG. 1 where aspects of a drill string are shown. In FIG. 1, an exemplary embodiment of an apparatus for performing logging while drilling is shown. In this example, a section of earth 1, which includes at least one formation 2, is penetrated by a drill string 3. The drill string 3 drives a drill bit 4. In this example, the drill bit 4 also provides a flow of a drilling fluid 5, such as drilling mud. That is, the drilling fluid 5 may be pumped downhole through the drilling pipe 8, and thus resulting in a flow of drilling fluid that is provided upward within a borehole 7 (also referred to as a "wellbore").

The drill string 3 may include a plurality of sections of the drill pipe 8. The drill pipe 8 may include wired pipe providing users with a communications channel. Included within the drill string 3 may be at least one logging apparatus 9. Exemplary logging apparatus include devices implementing resistivity, nuclear magnetic resonance, acoustic, seismic and other such technologies. Generally, included with the logging apparatus 9 is a package of downhole electronics 10. The downhole electronics 10 generally provide for collection and/or communication of downhole data to a package of surface based electronics 11. Included in this drill string 3 is a plurality of surface mounted antenna 12. The drill string 3 may also be referred to as "drill stem," and by other similar terms.

Collectively, the logging apparatus 9 and the associated electronics 10, 11 provide for such tasks as imaging of the at least one formation 2. In addition, the logging apparatus 9 and the associated electronics 10, 11 may provide for collection and/or communication of other information, such as measurement data from each of the antenna 12.

Generally, each of the antenna 12 are disposed such that the respective antenna 12 is operable for performing local measurements of resistivity, including measurement through the drilling fluid 5 and into the earth 1. Each of the antenna 12 may be powered by at least one of the electronics units 10, 11 and provide a signal to at least one of the electronics units 10, 11. In some embodiments, and as described herein, each of the electronics unit(s) 10, 11 may, alone or in combination, provide imaging information that is descriptive of aspects of the sub-surface materials in the surrounding earth 1.

In some embodiments, a body of the drill string 3 is referred to as a "drill collar." That is, an outer portion of the drill string 3 that is fabricated from material such as steel and is generally designed to communicate mechanical energy is referred to herein as the "drill collar 21." The drill collar 21 may be of varying dimensions including varying dimensions for each of an inner diameter and an outer diameter. For purposes herein, it is considered that the drill collar 21 is simply fabricated from steel, however, a wide variety of more specific types of materials and alloys may be used.

In general, the drill collar 21 is fabricated such that a single groove is apparent therein. The groove may be set using, for example, machining, casting and other similar techniques. In the embodiments discussed herein, the groove is approximately three inches high (i.e., three inches along a centerline axis of the drill string 3, shown as in the Z-direction), and approximately 0.25 inches deep into the drill collar 21. Of course, use of such dimensions are arbitrary, and therefore merely illustrative of the teachings herein.

In general, a single groove is provided in the drill collar. The single groove is generally approximately three inches high and approximately 0.25 inches deep into the drill collar. Ferrite material may or may not be used to enhance signal strength. Further detail is provided below with regard to test data. In some embodiments, band material(s) and/or insulating materials are used.

Figure 2:
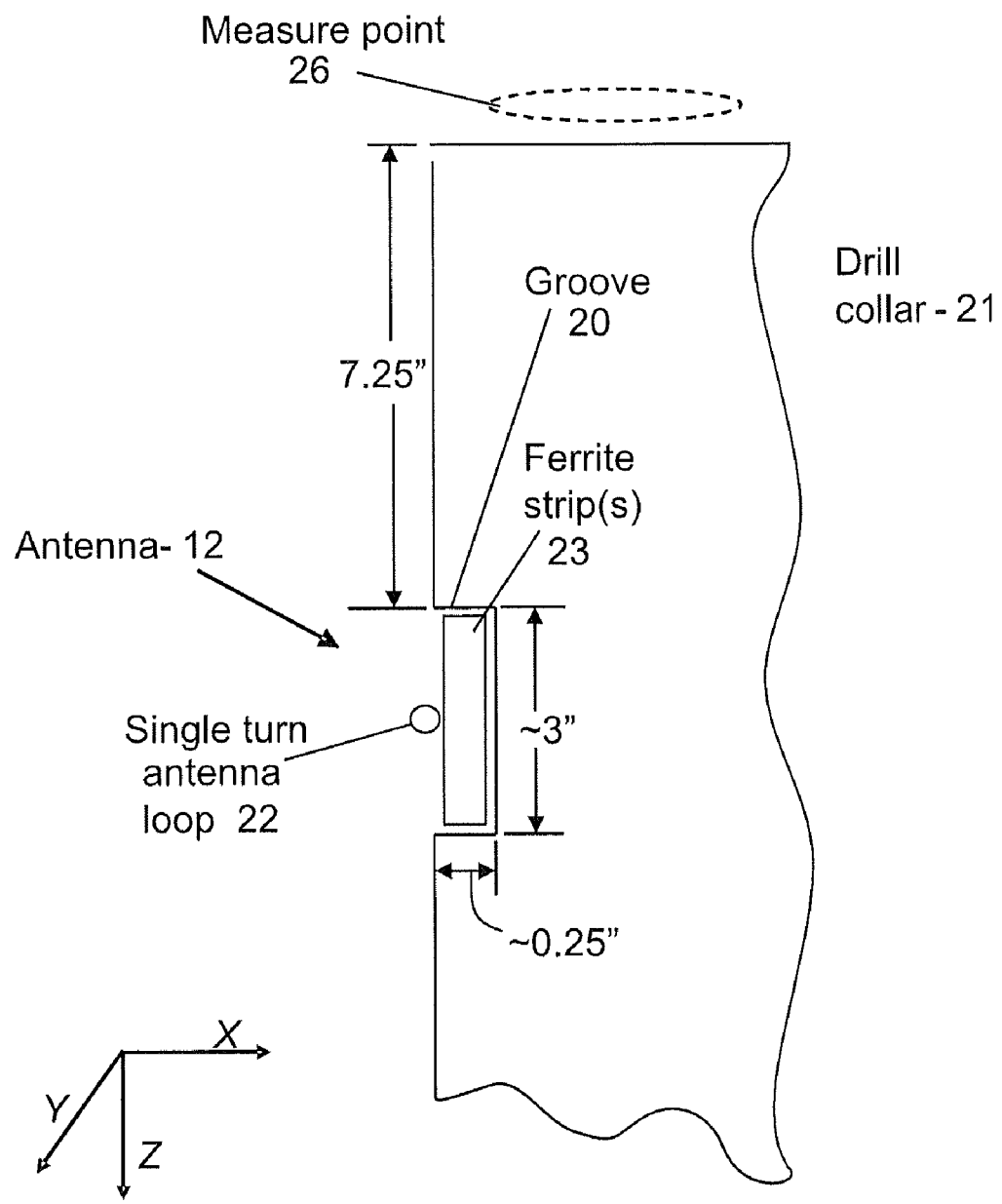
FIG. 2 depicts a single loop antenna embedded in a drill collar, provided for comparison.

Consider now a comparison of antennae. FIG. 2 provides an embodiment of an antenna 12 that includes a single antenna loop 22. Certain physical and performance aspects of the embodiment of FIG. 2 are described for comparison with an embodiment of an antenna according to the teachings herein, as described in FIG. 3

Refer now to FIG. 2, where aspects of the antenna 12 are shown. In this example, a groove 20 has been cut into the drill collar 21. The groove 20 is shown as providing a receptacle for accepting and retaining at least one ferrite strip 23. The at least one ferrite strip 23 is generally mounted using techniques as are known in the art, including by friction fit (i.e., machining with tight tolerances), use of adhesive(s), and/or mechanical retention (such as by an interlock device or feature). Placed outboard of the at least one ferrite strip 23 is a single antenna loop 22. In some embodiments, the single antenna loop 22 is formed of copper or a copper alloy, however other materials suited for use in antenna will suffice.

For evaluation of performance in this example, the single antenna loop 22 was coupled to a signal generator (not shown). The signal generator produced an output of about 100 millivolts (mv) peak-to-peak which was output to a 20 db attenuator and then to a power amplifier, which provided the signal to the single antenna loop 22. In this example, the single antenna loop 22 was tuned to an impedance of about 50 ohms. The signal was of about 1.00 amps (peak-to-peak) as measured with a current probe, at a frequency of about 2 MHz. A resulting signal as measured on a spectrum analyzer was about −56.3 dbm at about nine (9) inches above single antenna loop 22.

The embodiment shown in FIG. 2 is provided for comparative purposes. That is, a first embodiment of an antenna 12 according to the teachings herein is provided in FIG. 3. Performance of the antenna 12 of FIG. 3 is compared to the performance of the antenna of FIG. 2.

Figure 3:
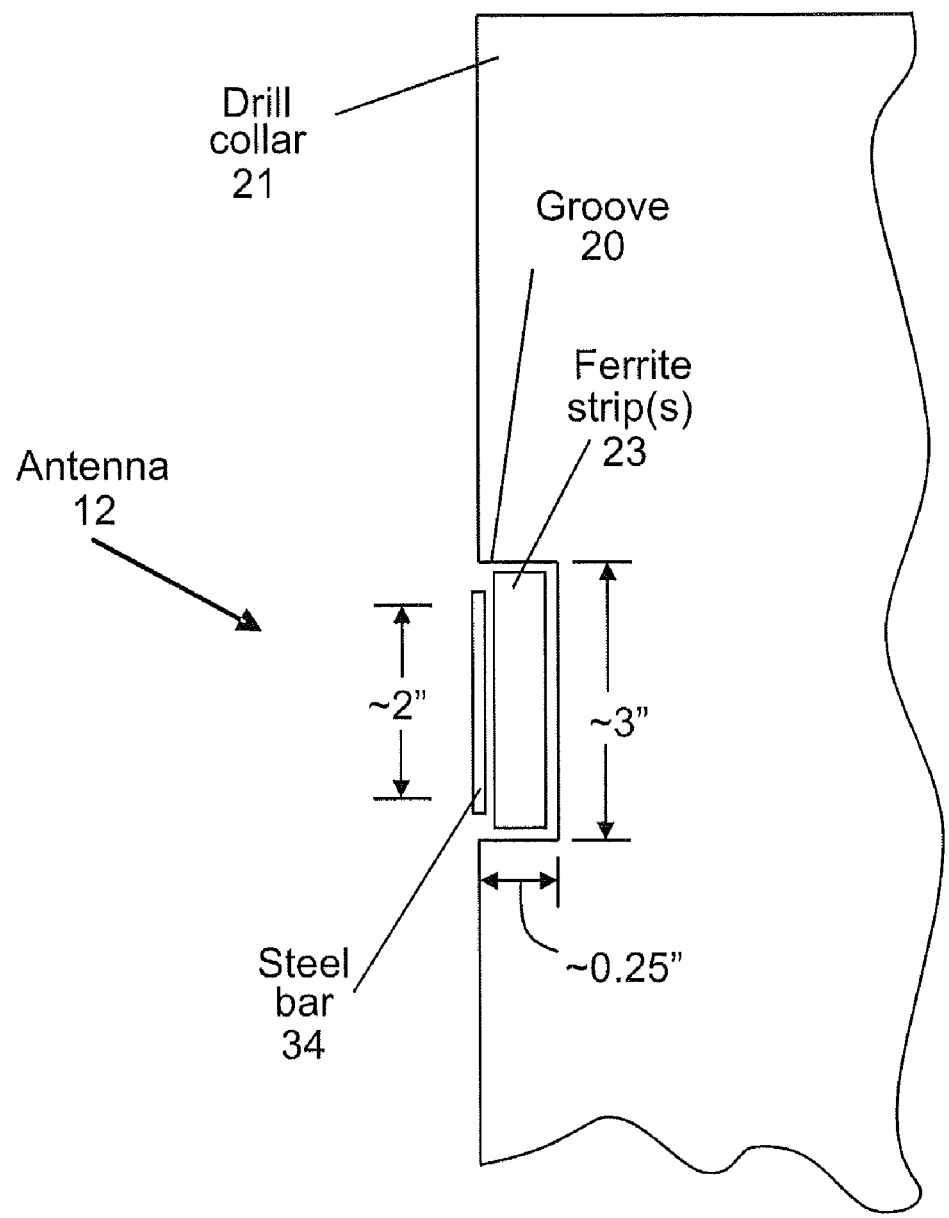
FIG. 3 depicts a band antenna according to the teachings herein embedded into the drill collar, and is compared to the antenna of FIG. 2.

In the embodiment shown in FIG. 3, the single antenna loop 22 of FIG. 2 has been replaced by a steel bar 34. In this embodiment, the steel bar 34 is placed over the ferrite strip(s) 23 to form a band antenna. The steel bar 34 may include a coupling to electronics, for example as a wire. For comparison, the signal generator was adjusted to provide a signal current of 1.0 Amp, peak-to-peak and 100 mv, peak-to-peak. No attenuator was used (in essence, providing a signal boost of about 20 db over the embodiment shown in FIG. 2). The signal was measured using a spectrum analyzer and produced an output of −63.7 dbm at about nine (9) inches above the steel bar 34. With a slight increase in the current (to about 1.03 Amps), the output was −58.2 dbm, also measured at about nine (9) inches above the steel bar 34.

In comparison, one may conclude that the steel bar 34 may function adequately as an antenna 12 (for example, if a signal increase of 20 db or more is achieved).

Figure 4:
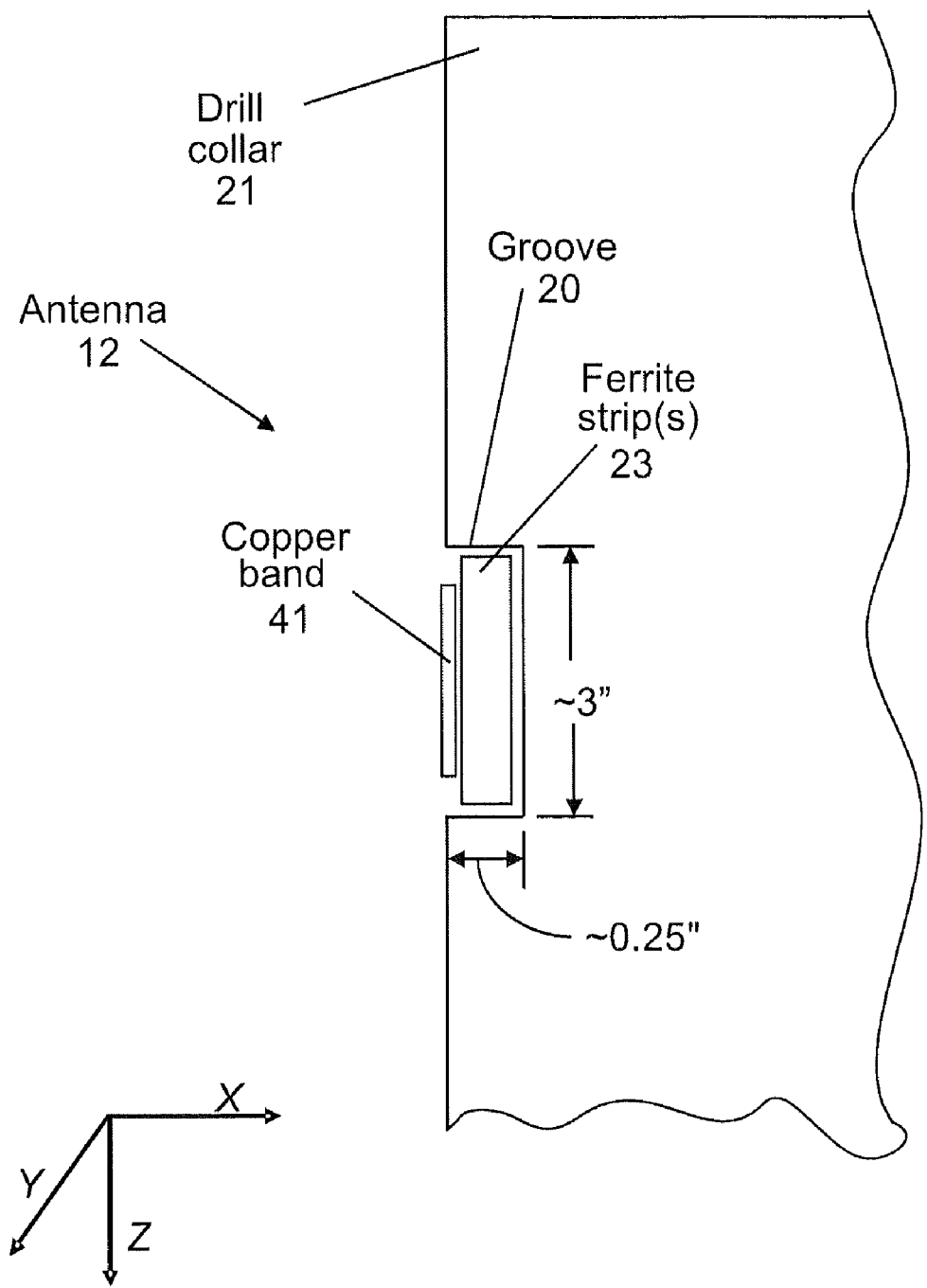
FIG. 4 depicts another band antenna according to the teachings herein embedded into the drill collar, and is compared to the antenna of FIG. 2.

Now with reference to FIG. 4, another embodiment of a band antenna is shown. In this example, a copper band 41 is used in place of the steel bar 34. In this example, the impedance of the of the band antenna using the copper band 41 is given as:

for 2 MHz, $Z=865\ m\Omega+(j)13.1\Omega$; and for 400 kHz, $Z=405\ m\Omega+(j)2.7\Omega$.

In general, the copper band 41 is about 2.9375 inches ($2^{15}/_{16}$ inches) wide, and there is clearance between the copper band 41 and the drill collar 21 of about 0.03125 inches ($^{1}/_{32}$ inches). As with the embodiment of FIG. 3, a signal of about 1.0 Amps is provided. At a frequency of about 2 MHz, the signal obtained was −66.7 dbm, for 400 kHz, the signal obtained was −74.5 dbm. Using about 1.48 Amps (peak-to-peak), the signal obtained was −57 dbm. Further embodiments are shown in FIGS. 5 and 6.

Figure 5:
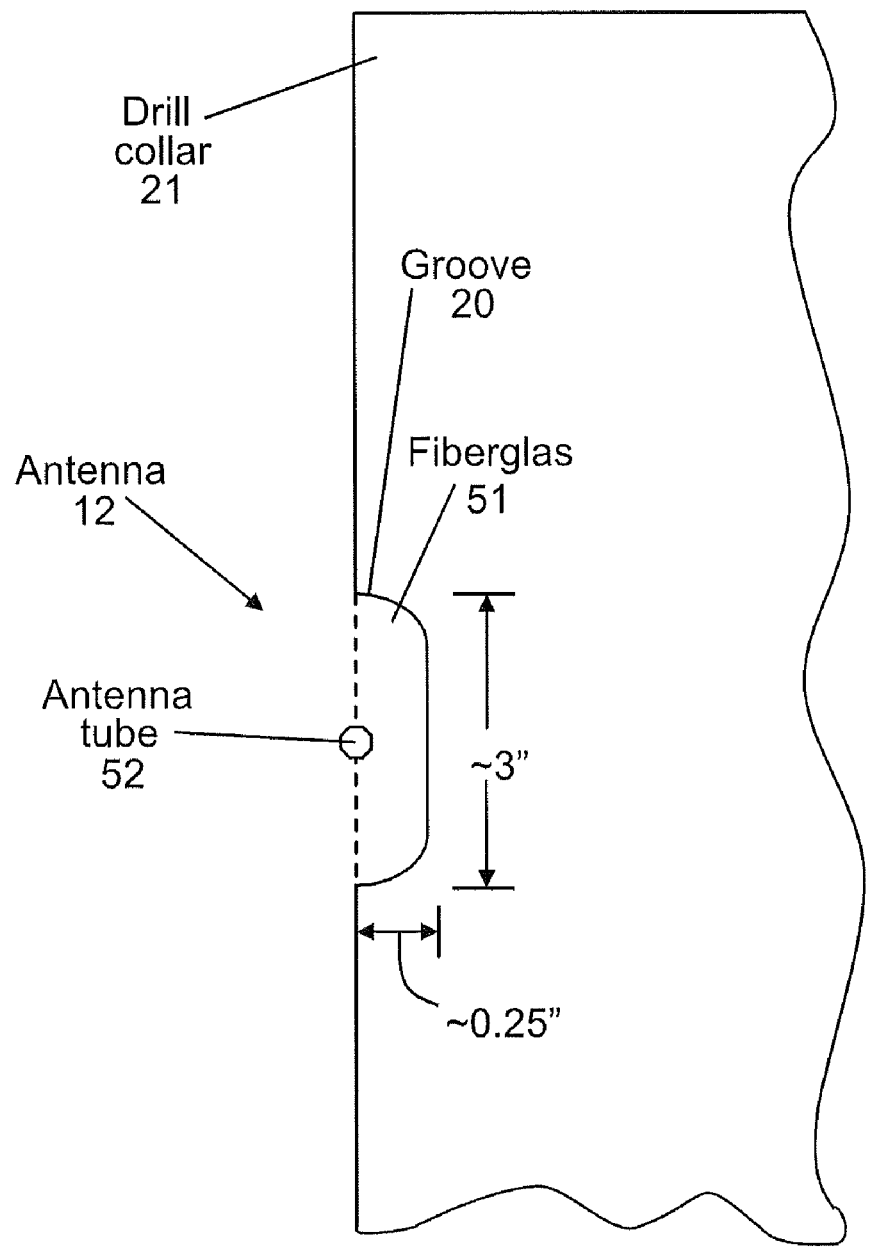
FIGS. 5 and 6 depict another example of a single loop antenna and band antenna, with the antennae being placed in fiberglass.
Figure 6:
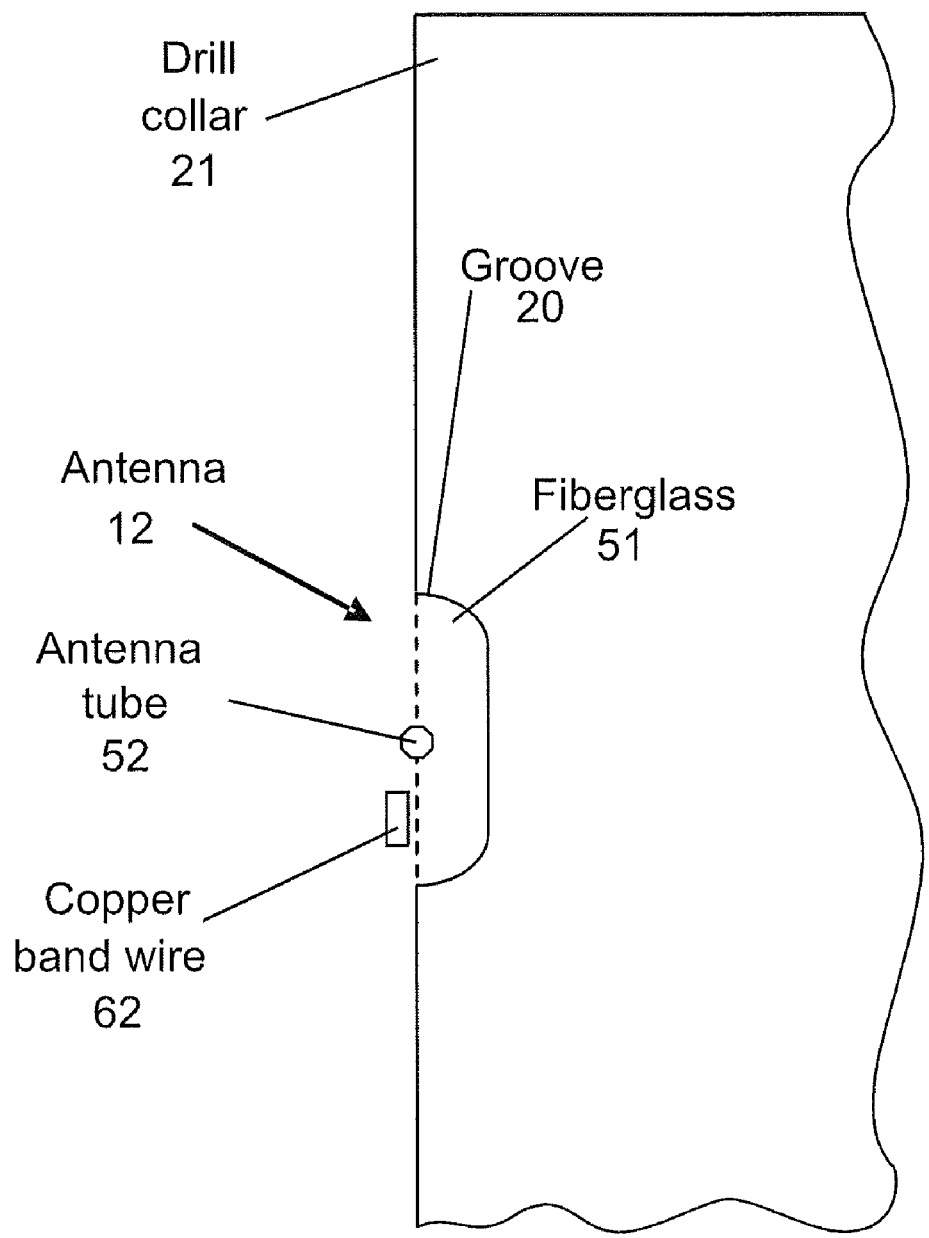

In FIGS. 5 and 6, fiberglass 51 is placed in the groove 20 in place of the ferrite strips 23. In FIG. 5, the antenna includes a copper antenna tube 52. In FIG. 6, the antenna tube 52 is accompanied by copper band wire. The copper band wire may be fabricated from, for example, an annealed copper microsquare, which may be a rectangular shaped wire of about 0.014 inches by 0.125 inches. In order to test performance of the resulting band antenna, the copper band wire 62 was connected to a signal generator that produced a signal of a frequency of about 2 MHz and 5 volts peak-to-peak. Using an oscilloscope, a signal of 730 mv and 176 milliamps was measured using an inductive probe at the band antenna. A measurement was made using a spectrum analyzer (in the same manner as the measurements above), and provided a signal of −39.7 dbm. For the tuned circuit, input current was set to 1.5 amps and voltage was set to 5.0 volts, peak-to-peak at 1.0 amps peak-to-peak. The spectrum analyzer provided a result of −7.1 dbm. All measurements were performed for a 2 MHz signal.

In other embodiments, other insulating materials are used, in place of or in addition to, the fiberglass 51. Such materials may be placed into the groove 20 by fitting preformed pieces into the groove 20, pouring, melting, curing and other such techniques. In some embodiments, the insulating materials (and/or fiberglass) are selected for protection from corrosion.

Having thus introduced the "band antenna," one skilled in the art will recognize certain commonalities in at least the embodiments provided herein. For example, the band antenna generally includes an antenna layer of metal (or other current conducting material) disposed over an intermediate layer, which has in turn been disposed upon the drill collar 21. Exemplary intermediate layers include ferrite strips, fiberglass, and other such materials. Each of the band antenna are ultimately coupled to electronics as are known in the art for producing electromagnetic signals, such as those used for resistivity measurements.

Antenna layers for the band antenna may include, for example, any one or more of: a film, a foil, a flattened wire, a shaped wire, a flexible circuit, a bar, a plate, a sheet, and other such forms. Materials for the band antenna may include conductive layers, such as and without limitation, copper, annealed copper, steel, nickel, aluminum and various alloys. The band antenna may be of a form that is segmented, continuous or in any suitable combination.

The antenna layer is generally selected for providing an unobtrusive antenna. In some embodiments, the band antenna circumferentially bounds an outer surface of the drill string 3 (e.g., the drill collar 21). Machining of the drill collar for receiving the antenna generally involves a minimal reduction in mechanical strength of drill components, as well as a minimal addition of antenna components. Consider FIGS. 7 and 8.

Figure 7:
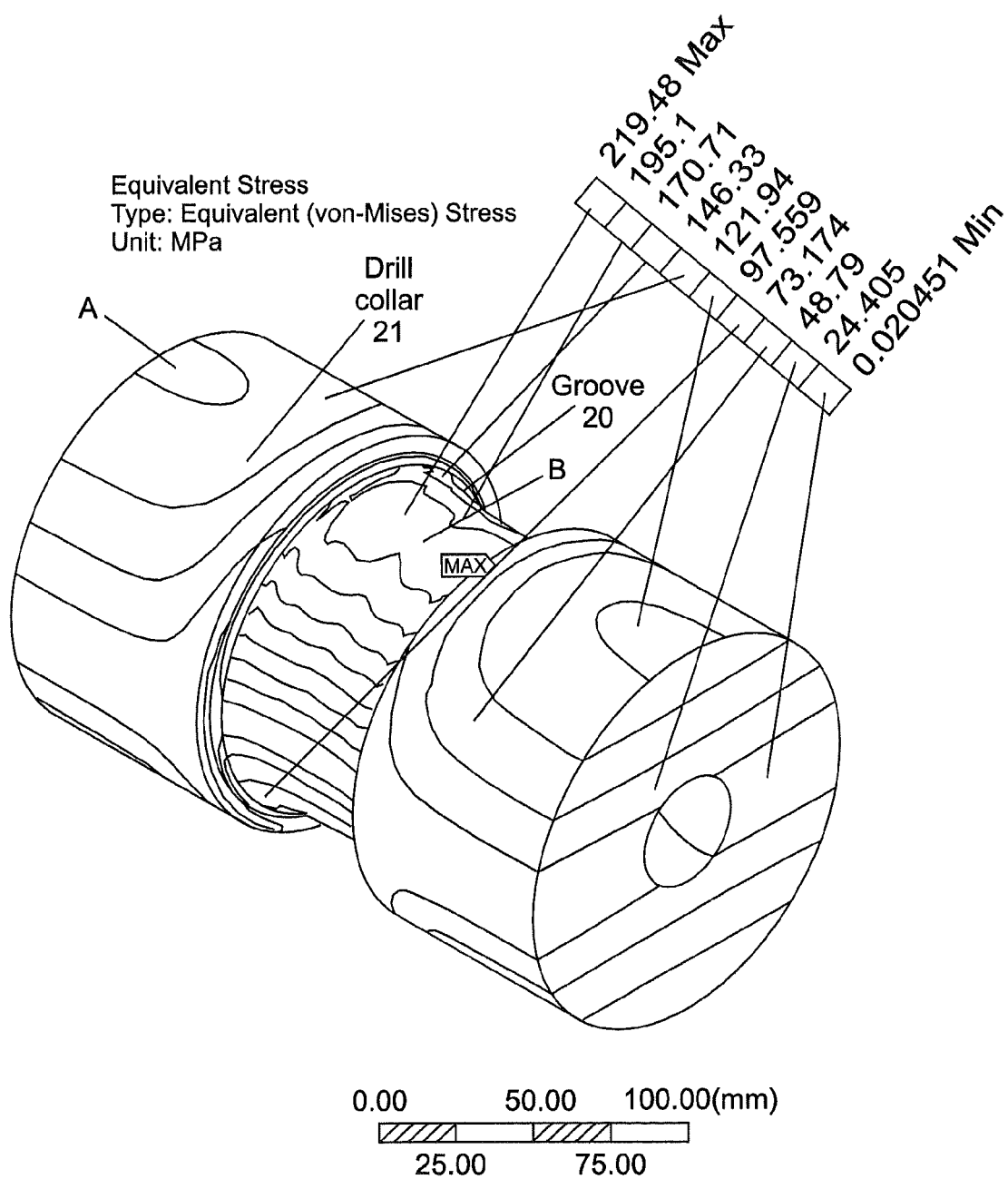

In each of FIGS. 7 and 8, an equivalent stress map is shown. In FIGS. 7 and 8, perspective cross sectional views of the drill collar 21 are shown. In FIG. 7, a complete cross sectional view is shown, and depicts a symmetric distribution of equivalent stress. In FIG. 8, a half section of the drill collar 21 is shown. In both illustrations, stress along the drill collar 21 and through the groove 20, may be evenly distributed. A maximum stress point is shown at a transitional area from the groove 20. Also, it should be noted that in both embodiments, a stress differential between the drill collar 21 and the groove 20 is within a reasonable ratio. That is, with regard to FIG. 7, a maximal stress along the drill collar 21 is about 75% that of maximal stress within the groove 20 (A/B, or about 110/about 207=about 1:1.9). In FIG. 8, the ratio is about 1:1.5.

In support of the teachings herein, various analysis components may be used, including at least one digital system and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An instrument disposed into a drill string for imaging an earth formation, the instrument comprising:
    at least one band antenna disposed over only one side of and completely surrounding an intermediate layer disposed into a groove in an outer surface of the drill string, wherein the intermediate layer comprises at least one of ferrite and another magnetically conductive material, the band antenna having a substantially rectangular cross section.

2. The instrument as in claim 1, wherein the band antenna comprises at least one of copper, annealed copper, steel, nickel, aluminum and an alloy.

3. The instrument as in claim 1, wherein the band antenna comprises at least one of a film, a foil, a flattened wire, a shaped wire, a flexible circuit, a bar, a plate, and a sheet of material.

4. The instrument as in claim 1, wherein the band antenna is one of segmented and continuous.

5. The instrument as in claim 1, wherein the groove is about a quarter of an inch deep and about three inches wide.

6. The instrument as in claim 1, further comprising a coupling on the band antenna for coupling to electronics.

7. The instrument as in claim 1, wherein a maximum ratio of stress along the drill collar to stress in the groove is about 1:1.5.

8. A method for fabricating an antenna in a drill string, the method comprising:
    placing a groove into an external circumference of the drill string;
    placing an intermediate material into the groove, the intermediate layer comprising at least one of ferrite and another magnetically conductive material; and
    mounting at least one band antenna having a substantially rectangular cross section onto only one side of the intermediate material such that it completely surrounds the intermediate antenna.

9. The method as in claim 8, wherein the placing of the groove comprises at least one of: machining and casting.

10. The method as in claim 8, wherein placing of the intermediate material comprises at least one of fitting preformed pieces into the groove, pouring, melting and curing.

11. The method as in claim 8, wherein mounting comprises maintaining a gap between the band antenna and the drill string.

\* \* \* \* \*